POTENTIAL SENSING PBX CLASS-OF-SERVICE SELECTOR CIRCUIT

INVENTORS R. J. BRAUND
S. B. WEINBERG
BY M. L. Rackman
ATTORNEY 3,441,679

POTENTIAL SENSING PBX CLASS-OF-SERVICE SELECTOR CIRCUIT

Reed J. Braund, Middletown, and Seymour B. Weinberg, Old Bridge, N.J., assignors to Bell Telephone Laboratories, Incorporated, New York, N.Y., a corporation of New York Filed Sept. 22, 1965, Ser. No. 489,110
Int. Cl. H04m 1/00
U.S. Cl. 179—18 3 Claims

ABSTRACT OF THE DISCLOSURE

To transmit signals indicating the type of service a particular telephone extension desires when placing a call one of a plurality of different valued resistors is inserted by depression of a nonlocking key into a path either between the tip and a signalling conductor or across the tip and ring conductors. At a control unit this resistor forms one leg of the Wheatstone bridge and different valued resistors are successively inserted into a second leg of the bridge until a balance is obtained to indicate the type of service requested. If only the tip and ring conductors are utilized a connecting circuit at the control unit prevents connection of the Wheatstone bridge to the ring conductor until after a signalling key is depressed.

Figure 1:
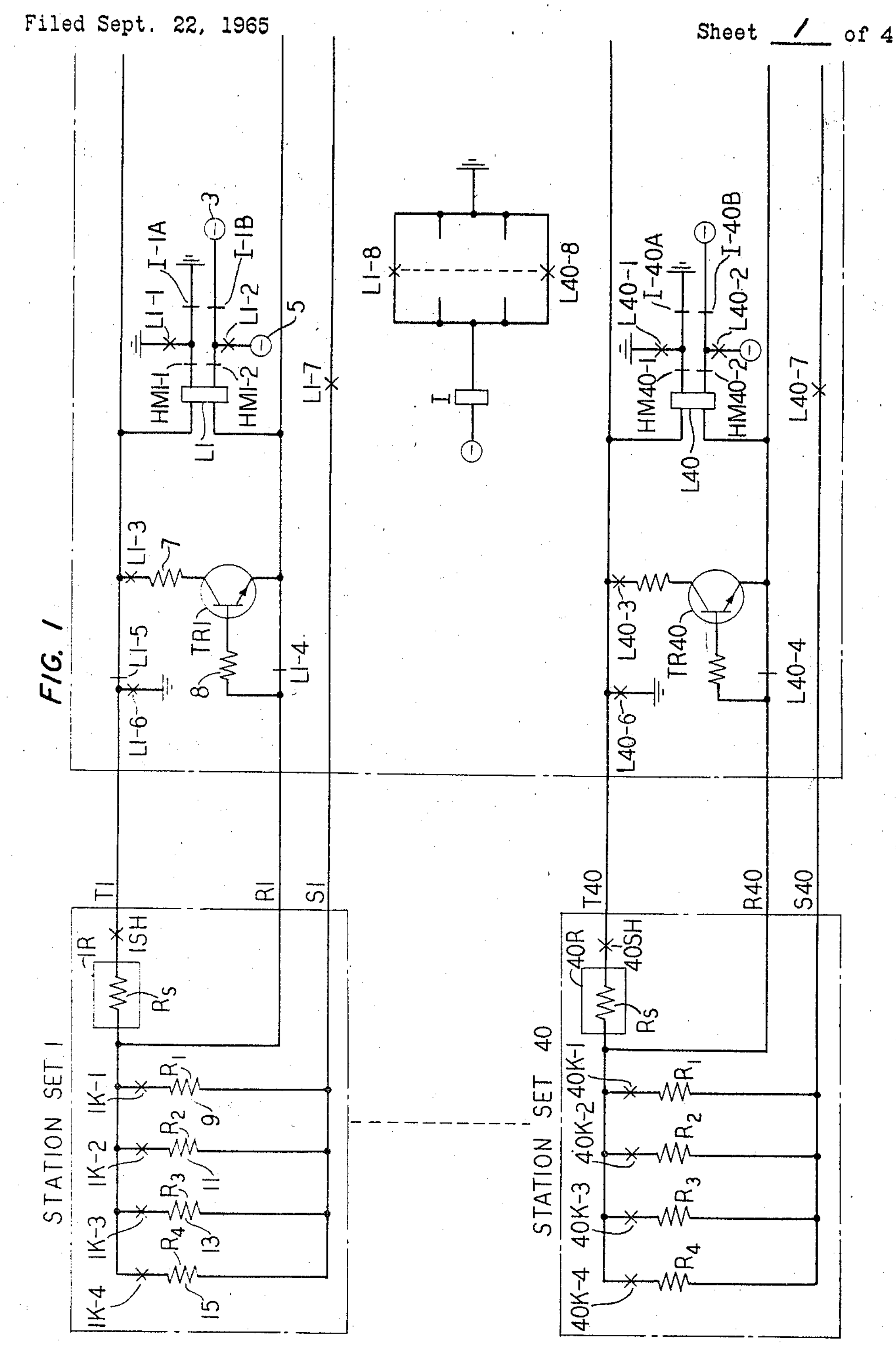

This invention relates to signaling systems and more particularly to telephone signaling circuits.

Most telephone sets are equipped to transmit two types of information to a switching system such as a central office. One type of information is supervisory, e.g., on-hook and off-hook signals. The other type is call signaling information such as dial pulses. In some systems however additional information must be transmitted from a telephone set to the switching system. This information often relates to the type of call to be made by a party originating a service request. For example, in private branch exchanges designed for use in hotels a guest may request the assistance of the hotel operator, or he may be allowed to dial directly another extension in the hotel. Similarly, the guest may be allowed to seize directly a central office trunk or a toll trunk. When the guest first goes off-hook to originate the call a signal representing the desired service is transmitted to the PBX control following the off-hook signal. Depending on the particular signal detected by the control a prescribed switching sequence is carried out.

Consider a PBX system in which a calling party may be provided with one of four different types of service. In such a system as disclosed in Braund et al. application Ser. No. 335,900, filed Jan. 6, 1964, now Patent 3,327,064, issued June 20, 1967, each telephone set is provided with four nonlocking keys, one of which is operated after the calling party first goes off-hook. A separate conductor is extended between the telephone set and the control unit for each of the four keys and the control unit is made aware of the particular service requiseted depending upon which of the four conductors is energized. In this system, in addition to the conventional tip and ring conductors a separate conductor is extended between each telephone set and the control unit for each type of service which is provided.

It is a general object of this invention to provide a signaling circuit for a telephone system in which information pertaining to the type of service requested is always transmitted over a single conductor extended between a telephone set and the control unit.

In the first illustrative embodiment of our invention, in addition to the tip and ring conductors extended between each telephone set and the control unit, a third signaling conductor connects the set to the control unit. The signaling conductor is connected in the telephone set to four different valued resistors, each of which is in turn connected through normally open contacts to ground. After the calling party goes off-hook he operates one of the four non-locking keys, each of which controls the closing of a respective set of contacts. Dependent upon the particular key which is operated, the signaling conductor is connected to ground through one of the four different valued resistors.

In the control unit there is provided a Wheatstone bridge. The signaling conductor of the station requesting service is connected in one of the four legs of the bridge. Two of the legs in the bridge include equal valued resistors. The fourth leg contains a resistance which is variable in discrete steps. The bridge is initially unbalanced and the control unit causes the resistance of the fourth leg to be varied in discrete steps until the resistance of this leg matches the resistance inserted in the signaling conductor at the calling station. At this time the bridge is balanced and the control unit, by determining the number of steps taken in balancing the bride, is made aware of the type of service requested. In this manner only a single signaling conductor is required in order that the control unit be notified of the action required.

In a second illustrative embodiment of our invention only tip and ring conductors are extended between each telephone set and the control unit. Instead of providing a third signaling conductor, when one of the type-of-service keys is first operated the respective resistor is placed in series with the ring lead. The ring lead of the station requesting service is included in one leg of the Wheatstone bridge. While this arrangement is more advantageous than the first in that a special signaling conductor is not required for each station, because the off-hook service requesting signal and the type-of-service signal are both transmitted over the same ring conductor, the Wheatstone bridge may operate improperly. This is due primarily to the fact that the control unit may cause the resistance of the fourth leg of the bridge to be varied in discrete steps immediately after the calling party goes off-hook, even before he first operates one of his four type-of-service keys. For this reason additional circuitry is required in the control unit to prevent the operation of the bridge circuitry when a party goes off-hook until after he has operated one of his type-of-service keys.

It is a feature of this invention to control the insertion of a resistor at each station in series with a signaling conductor extended between the station and the control unit, the magnitude of the resistor depending upon the type of service desired.

It is another feature of this invention to include the signaling conductor in one leg of a Wheatstone bridge, to vary the resistance of another leg of the bridge in discrete steps until the bridge is balanced, and to determine from the number of steps taken to balance the bridge the type of service requested.

It is still another feature of this invention, in one embodiment thereof where the signaling conductor is also used to transmit the off-hook service request signal, to delay the operation of the bridge circuitry until the calling party causes a resistance in his station set to be placed in series with the signaling conductor.

Figure 2:
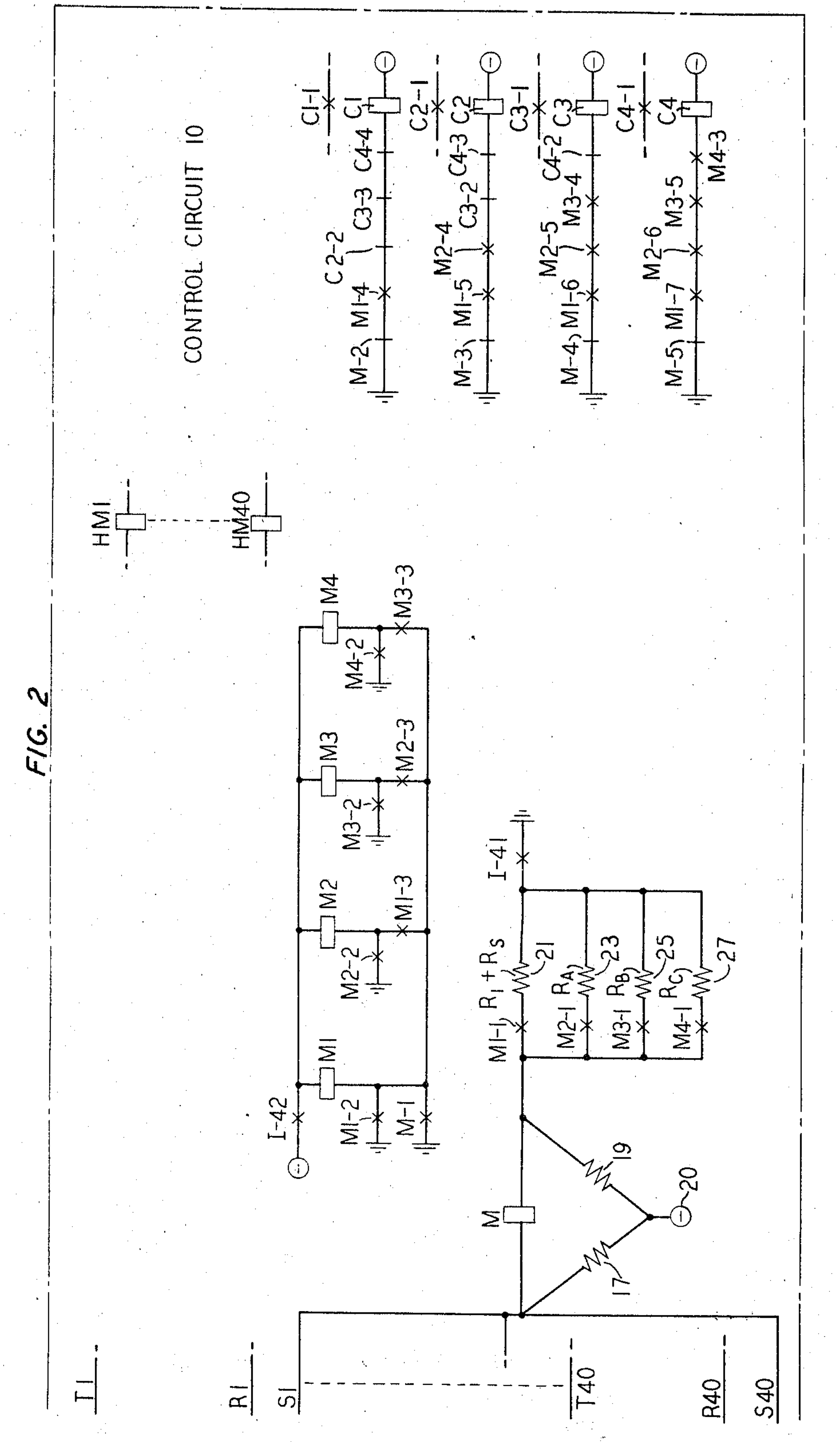
Figure 3:
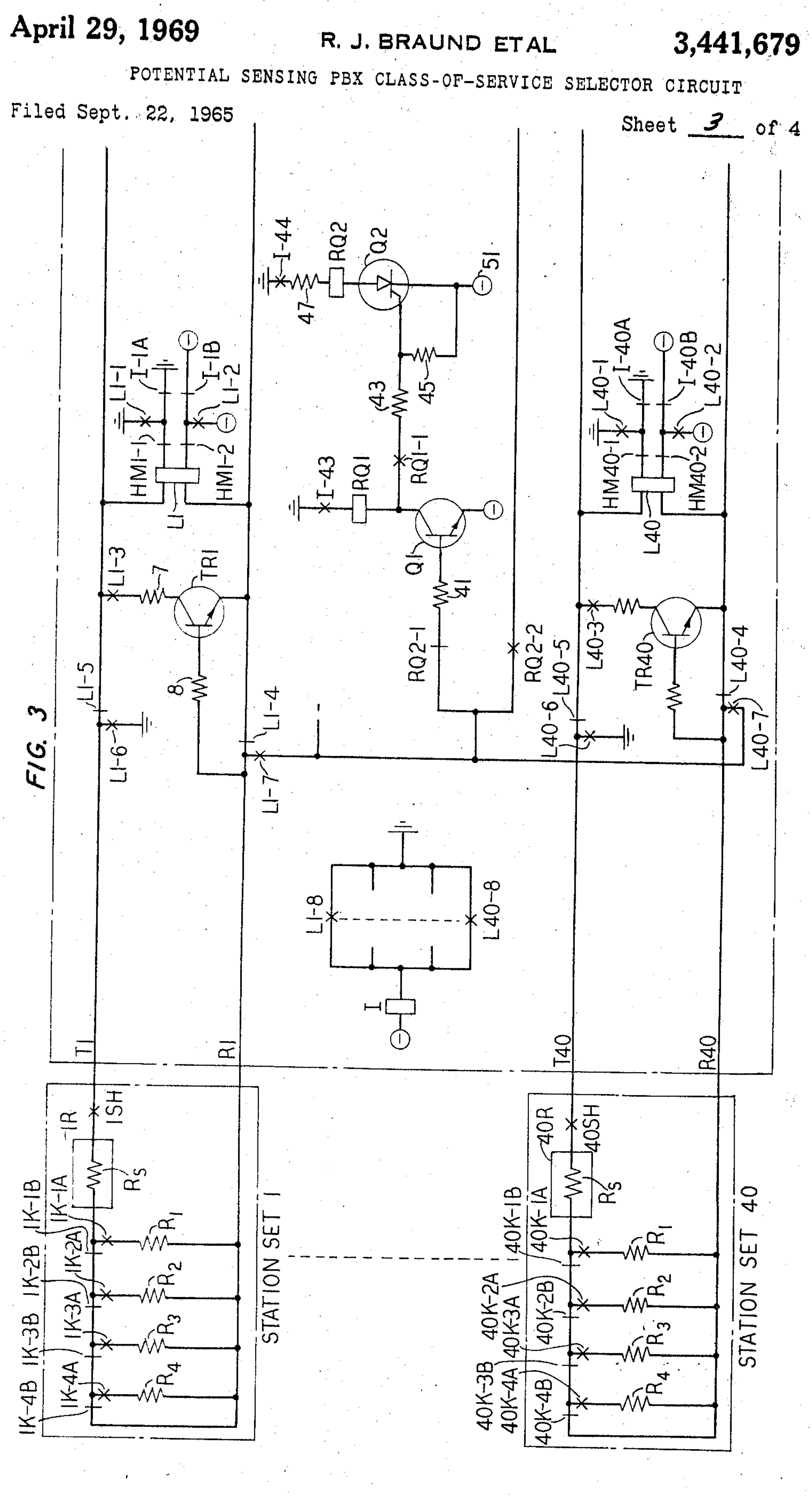
Figure 4:
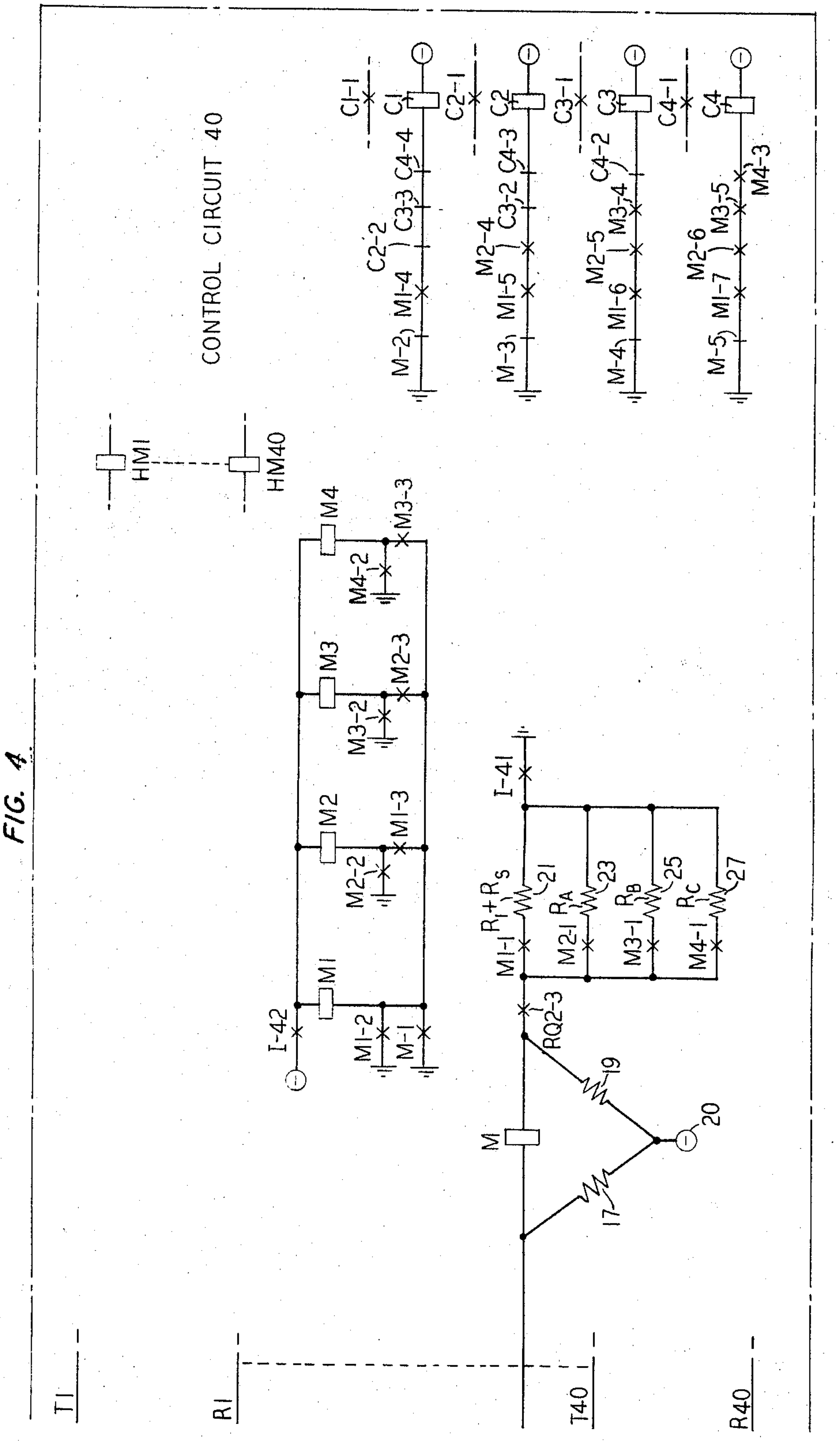

Further objects, features and advantages of the invention will become apparent upon consideration of the following detailed description in conjunction with the drawing, in which:

FIGS. 1 and 2, with FIG. 1 being placed to the left of FIG. 2, show a first illustrative embodiment of the invention; and FIGS. 3 and 4, with FIG. 3 being placed to the left of FIG. 4, show a second illustrative embodiment of the invention.

Referring to FIGS. 1 and 2 it is seen that the system includes 40 station sets connected to control unit 10. Each station is provided with T, R and S leads for connecting it to the control circuitry. The only circuitry shown in control unit 10 is that required for an understanding of our invention. The control unit also contains circuitry for establishing and supervising telephone calls but since it is not necessary to understand the operation of this circuitry in order that the signaling circuitry of our invention be appreciated this control circuitry is omitted in the drawing. Such circuitry may be as shown in the aforementioned Braund et al. application.

Consider a call originating at station set 1. The station set includes four resistors 9, 11, 13 and 15, having respective magnitudes $R_1$, $R_2$, $R_3$ and $R_4$, and four respective nonlocking key contacts, 1K–1, 1K–2, 1K–3 and 1K–4. Contacts 1SH are switchhook contacts in the tip conductor T1. Box 1R contains the remainder of the equipment in the station set, this equipment being that found in the conventional telephone set.

Ground potential is extended through normally closed contacts I–1A and HM1–1, the upper winding of relay L1 and contacts L1–5 to tip conductor T1. The negative potential of source 3 is extended through normally closed contacts I–1B and HM1–2, the lower winding of relay L1 and contacts L1–4 to ring conductor R1. When the party at station 1 goes off-hook to originate a call contacts 1SH close and current flows through the tip and ring conductors and both windings of relay L1. With the operation of the relay contacts L1–8 close and relay I operates. The two contacts on this relay associated with each line open. This is to prevent other stations from going off-hook and operating their L relays. For example, with contacts I–40A and I–40B open relay L40 cannot operate if the party at station 40 goes off-hook. Since contacts I–1A and I–1B also open a holding path must be provided for relay L1. Contacts L1–1 and L1–2, now closed, connect the windings of the relay to ground and negative source 5.

With the operation of relay L1 contacts L1–5 open to disconnect conductor T1 from the transistor and relay circuitry. However, since contacts L1–6 close ground potential is still applied to conductor T1. Since contacts L1–5 are open another holding path must be provided to maintain relay L1 energized. The holding current for the relay flows through transistor TR1. Ground potential is extended through contacts L1–1 and HM1–1, the upper winding of relay L1, contacts L1–3 and resistor 7 to the collector of transistor TR1. The ground potential on conductor T1 is extended through the station set to conductor R1, and through resistor 8 to the base of transistor TR1. Since contacts L1–4 are open the ground potential is not extended to the emitter terminal. Instead, the emitter is connected through the lower winding of relay L1, and contacts HM1–2 and L1–2 to negative source 5. Since the base-emitter junction of the transistor is forward biased current flows from the collector to the emitter. Since this current also flows through both windings of relay L1 the relay remains energized.

The 40 signaling conductors S1 through S40 are tied together at one end of the winding of relay M. Since the I relay prevents more than one L relay from being operated at any time, and since the –7 contacts on each L relay are included in the respective S conductor, effectively only one of the S conductors is connected to the junction of relay M and resistor 17. With the party at station 1 originating the call, contacts L1–7 are closed and conductor S1 is connected to the winding of relay M. Until one of the keys 1K–1 through 1K–4 is operated conductor S1 is not energized. However, when the calling party operates one of his type-of-service keys the ground potential applied directly to conductor T1 is extended through the telephone equipment 1R, the key contacts, and one of resistors 9, 11, 13 or 15 to conductor S1. The total impedance seen looking into equipment 1R is shown symbolically as $R_s$. Consequently when one of the type-of-service keys is operated conductor S1 is connected to ground potential through a total impedance of $R_1+R_s$, $R_2+R_s$, $R_3+R_s$ or $R_4+R_s$.

Referring to FIG. 2 it is seen that the winding of relay M is included in the center leg of a Wheatstone bridge. Negative source 20 is connected through two equal valued resistors 17 and 19 to both ends of the winding of relay M. One end is connected to ground potential through conductor S1 and one of the four impedance given above. The other end of the winding can also be connected to ground through one of four resistors 21, 23, 25 and 27, although initially the connection is not established. While contacts I–41 are closed, all of contacts M1–1, M2–1, M3–1 and M4–1 are initially open. Thus when one of the nonlocking keys is operated at station set 1 current flows from ground through conductor S1 and the parallel path comprising resistor 17, and the winding of relay M and resistor 19, to negative source 20. Relay M thus operates. Contacts M–1 close and relay M1 operates through these contacts and contacts I–42. When contacts M1–2 close relay M1 is held operated not only through contacts M–1 but also through contacts M1–2. When relay M1 operates, contacts M1–1 close and the junction of the winding of relay M and resistor 19 is connected through these contacts, resistor 21 and contacts I–41 to ground.

Resistor 21 has a magnitude $R_1+R_s$. When contacts M1–1 close and resistor 21 is placed in one leg of the bridge, if the resistance in conductor S1 has the same magnitude, the bridge is balanced and the two ends of the winding of relay M are held at the same potential. Relay M releases and contacts M–1 open. The opening of these contacts prevents relays M2, M3 and M4 from operating. Relay M1 remains energized however since contacts M1–2 are closed. Since contacts M1–1 are closed and contacts M2–1, M3–1 and M4–1 remain open the bridge remains balanced with resistor 21 held in the variable leg.

Suppose that key 1K–1 was not operated in the station set and consequently the resistance in conductor S1 is not $R_1+R_s$. When resistor 21 is placed in the bridge, the bridge is not balanced and relay M remains operated. Since contacts M–1 remain closed as well as contacts M1–3, relay M2 operates. When contacts M2–2 close the relay locks to ground and remains operated even when contacts M–1 subsequently open. With relay M2 operated contacts M2–1 are closed. Resistor 23 is now placed in parallel with resistor 21 between ground and the winding of relay M. The magnitude of resistor 23 is $R_A$ and the total impedance of the parallel combination of resistors 21 and 23 equals $R_2+R_s$. The magnitude of resistor $R_A$ required for the proper operation of the circuit is easily determined from the relationship $$R_A(R_1+R_s)/(R_A+R_1+R_s)=R_2+R_s$$

With the total impedance of the variable leg being $R_2+R_s$ the bridge is balanced only if key 1K–2 is operated in the station set thus inserting a total impedance of $R_2+R_s$ in conductor S1. If the bridge is balanced relay M releases and with the opening of contacts M–1 relays M3 and M4 are prevented from operating. Only relays M1 and M2 remain energized, these relays being held operated by respective contacts M1–2 and M2–2.

Suppose that neither of keys 1K–1 and 1K–2 has been operated. In such a case when relay M2 operates and contacts M2–1 close the bridge is still unbalanced. Since contacts M–1 remain closed relay M3 operates through contacts M2–3 and M–1. The relay locks to ground over its contacts M3–2. With contacts M3–1 now closed a third resistance 25 is placed in parallel with the first two resistances 21 and 23 in the variable leg of the bridge. The magnitude of resistor 25, $R_B$, is such that the total impedance presented by resistors 21, 23 and 25 connected in parallel is $R_3+R_s$. If key 1K–3 is the one operated in the station set the bridge is balanced and relay M releases. As a result relay M4 cannot energize and only relays M1, M2 and M3 remain operated. On the other hand, if key 1K–4 is the one in the station set which is operated the bridge is not balanced when contacts M3–1 close. Relay M remains operated and relay M4 operates over contacts M3–3 and M–1. With the closing of contacts M4–1 a fourth resistance 27 is placed in parallel with the first three in the variable leg of the bridge. The magnitude of resistor 27, $R_C$, is such that the four resistors 21, 23, 25 and 27 connected in parallel have a total impedance $R_4+R_s$. At this time relay M releases since the bridge is balanced. Although contacts M–1 open all four of relays M1, M2, M3 and M4 remain operated over contacts I–42 and the respective –2 contacts on the relays. Although the operated key is nonlocking and consequently conductor S1 is connected to ground through one of the respective resistors for only a fraction of a second the stepping action of relays M1, M2, M3 and M4 is so rapid that by the time the key releases one, two, three or all four of the relays remain energized.

While the bridge is unbalanced all of contacts M–2 through M–5 are open and none of relays C1, C2, C3 and C4 can operate. However, when the bridge is finally balanced one of these relays operates. If relay M1 is the only one of relays M1–M4 which is operated when relay M releases, relay C1 operates through contacts M–2, M1–4, C2–2, C3–3 and C4–4. Relays C2–C4 are not energized since the operating path for each of these relays contains at least one set of open contacts on relays M2–M4. If relays M1 and M2 are both operated only relay C2 energizes, since the operating path for the relay includes closed contacts M–3, M1–5, M2–4, C3–2 and C4–3. Relay C1 does not operate since contacts C2–2 in its operating path are open. Relays C3 and C4 do not operate since the operating path for relay C3 includes open contacts M3–4, and the operating path for relay C4 includes open contacts M3–5 and M4–3. If relays M1, M2 and M3 are operated only relay C3 energizes through contacts M–4, M1–6, M2–5, M3–4 and C4–2. Relays C1 and C2 do not operate because contacts C4–3 and C4–4 are open. Relay C4 does not operate because contacts M4–3 are open. Finally, if all four of relays M1–M4 are operated only relay C4 operates through contacts M–5, M1–7, M2–6, M3–5 and M4–3. Relays C1, C2 and C3 do not energize since contacts C4–2, C4–3 and C4–4 are open. Thus when the bridge is finally balanced and contacts M–2 through M–5 close only one of relays C1–C4 energizes. Only one set of contacts C1–1, C2–1, C3–1 and C4–1 close. These contacts are included in respective conductors and depending on which of the four conductors includes the closed contacts the control unit sets up the respective type of call.

In the course of setting up the call the control unit operates one of the 40 relays HM1–HM40, each associated with a respective one of the lines. Typically, these relays may control the connection of the respective line to an originating register which returns dial tone to the calling station and registers the dial pulses transmitted; in the above-mentioned Braund et al. application these are hold magnet relays on the crossbar switches connecting the calling station to the common equipment. It will be recalled that with relay L1 operated the station set conductors T1 and R1 are not connected to the control unit since contacts L1–5 and L1–4 are open. When relay HM1 operates however contacts HM1–1 and HM1–2 open to release relay L1. Relay HM1 remains operated until the call is terminated and consequently relay L1 does not energize for the remainder of the call. With the relay released and contacts L1–4 and L1–5 closed conductors T1 and R1 are extended through the control unit to the originating register, and after the call is established to the called line. When relay L1 releases contacts L1–8 open. Relay I releases and when the two contacts on this relay included in the operating paths of the other 39 L relays close, one of these L relays may operate to initiate service for another party going off-hook. When relay I releases contacts I–41 and I–42 also open. When contacts I–42 open the operated ones of relays M1–M4 and the operated one of relays C1–C4 release. With contacts I–41, M1–1, M2–1, M3–1 and M4–1 all open the bridge is reset for a new operation. Relay M remains unoperated since the right end of its winding is connected only through resistor 19 to negative source 20, and the left end of its winding (since all of the signaling conductors are open) is connected through resistor 17 to the same source.

The embodiment of FIGS. 1 and 2 includes a special signaling conductor in each station line. Although this signal conductor replaces the four conductors used in the prior systems (by adding additional resistors and relays more than four types of signals may be transmitted over each conductor if necessary), it may be desirable in some applications to provide only a two-wire line for each station. The embodiment of FIGS. 3 and 4 enables the type-of-service signal to be transmitter over the ring conductor of each line and thus the only conductors required for each line are the tip and ring. The basic problem in such an arrangement is the following. It will be recalled that the bridge stepping sequence in the first embodiment begins as soon as one of the S conductors is connected to ground through a respective resistance. If the R conductors are coupled directly to the bridge, the steeping sequence may begin when the calling party first goes off-hook and his ring conductor is first energized—even before one of the type-of-service keys is operated. For this reason additional circuitry is required in the embodiment of FIGS. 3 and 4 to insure that the stepping sequence does not begin until after one of the keys is operated even though the ring conductor of the station requesting service is energized when the calling party first goes off-hook.

Before describing the operation of the circuit the difference between FIGS. 3 and 4 and FIGS. 1 and 2 should be noted. Each type-of-service key in the station sets of the second embodiment includes break contacts as well as make contacts. Thus, for example, when the first key in station set 1 is operated contacts 1K–1B open at the same time that contacts 1K-1A close. The contacts are break-before-make, that is, the –1B contacts controlled by any key open before the respective –1A contacts close.

In the first embodiment the 40S conductors are all coupled to the bridge through –7 contacts on the respective L relays. In the second embodiment since the ring conductors are coupled to the bridge circuitry the –7 contacts on the L relays are included in the conductors connecting the ring conductors to the bridge. The circuitry including transistor Q1, PNPN switch Q2 and relays RQ1 and RQ2 is connected to the junction point which couples the ring conductors to the bridge circuitry. The stepping circuitry is the same except for the addition of contacts RQ2–3 at the right end of the winding of relay M.

When a calling station goes off-hook its respective L relay operates as described with respect to the L relay in FIGS. 1 and 2. Referring to station set 1 for example, it is seen that when switchhook contacts 1SH are closed the tip and ring conductors are connected together through normally closed contacts 1K–1B, 1K–2B, 1K–3B and 1K–4B. When relay L1 operates transistor TR1 conducts to hold the relay. Again, the operation of an L relay causes the I relay to energize for preventing other stations from originating service requests. When contacts L1–7 close conductor R1 is connected through normally closed contacts RQ2–1 and resistor 41 to the base of transistor Q1. Since contacts RQ2–2 are at this time open the ground potential of conductor R1 is not extended to the left end of the winding of relay M. Since contacts RQ2–3 are also open the other end of the relay winding is also not extended to ground potential. (Since contacts M1–1 through M4–1 are also all open contacts RQ2–3 merely offer additional assurance that relay M will not operate.)

The ground potential at the base of transistor Q1 forward biases the base-emitter junction. Since contacts I–43 are closed current flows through the transistor and the winding of relay RQ1 to energize the relay. PNPN switch Q2 remains off. Since transistor Q1 conducts the collector is at a negative potential and when contacts RQ1–1 close the negative potential is applied through resistor 43 to the control terminal of PNPN switch Q2. The switch thus remains off. The closing of contacts RQ1–1 is preparatory to the firing of the switch. The initial ground potential on conductor R1 merely prepares the triggering path.

The calling party then operates one of the type-of-service keys at his station. Since the break contacts on the key open before the make contacts close the ground potential on conductor R1 is removed for an instant. The time between the opening of the break contacts and the closing of the make contacts is sufficient, however, to turn off transistor Q1. The collector of the transistor rises to ground potential. Contacts RQ1–1 remain closed since relay RQ1 cannot release instantaneously and the ground potential triggers PNPN switch Q2. Once the switch is triggered it remains on independent of the value of the potential at the control terminal. Current flows from ground through contacts I–44, resistor 47, the winding of relay RQ2 and switch Q2 to negative source 51. With the operation of relay RQ2 contacts RQ2–1 open, and contacts RQ2–2 and RQ2–3 close. With the opening of contacts RQ2–1 relay RQ1 releases since transistor Q1 remains off. PNPN switch Q2 remains on however and relay RQ2 remains operated. With the closing of contacts RQ2–2 the ring conductor of the calling station, connected through an impedance of magnitude $R_1+R_s$, $R_2+R_s$, $R_3+R_s$, or $R_4+R_s$ to ground, is connected to the left end of the winding of relay M. Since contacts RQ2–3 are closed the right end of the winding is connected to the variable impedance leg of the bridge. The stepping sequence which ensues is identical to that described with reference to the first embodiment. At the end of the sequence only one of relays C1–C4 is operated to enable the control unit to determine which type of service is required. Once the control unit determines the line requesting service, e.g., by examining which contacts in an additional set of L relays contacts are closed the respective HM relay is operated. The operated L relay releases and the I relay de-energizes. With the opening of contacts I–44 PNPN switch Q2 turns off and relay RQ2 releases. With the closing of contacts RQ2–1 and the opening of contacts RQ2–2 and RQ2–3 the circuit is restored to its normal condition and is ready to handle a new call. It is seen that in FIGS. 3 and 4 it is possible to use the ring conductor of each line, rather than a third signaling conductor, to transmit type-of-service information. The additional circuitry including transistor Q1, switch Q2 and relays RQ1 and RQ2 is required so that the stepping mechanism not operated when a calling party goes off-hook until after a type-of-service key has been operated at the calling station.

Although the invention has been described with reference to two particular embodiments, it is to be understood that the arrangements are merely illustrative of the application of the principles of the invention. Numerous modifications may be made therein and other arrangements may be devised without departing from the spirit and scope of the invention.

What is claimed is:

1. A telephone signaling arrangement for transmitting information over a telephone line from a telephone set to a control unit comprising tip and ring conductors connected between said telephone set and said control unit, means in said control unit responsive to said telephone set going off-hook to originate a service request for extending a ground potential from said tip conductor through said telephone set to said ring conductor, a plurality of different valued resistors in said telephone set, a plurality of pushbutton means in said telephone set each for disconnecting said grounded tip conductor from said ring conductor and for then inserting a respective one of said resistors between said tip and ring conductors to represent a request for a respective type of service, a Wheatstone bridge in said control unit, means for connecting said ring conductors in one leg of said bridge, said connecting means including first means responsive to ground potential on said ring conductor when said telephone set goes off-hook and second means responsive to removal of said ground potential from said ring conductor prior to the insertion of one of said resistors between said ring conductor and said grounded tip conductor for completing the connection of said ring conductor in said one leg of said bridge, means responsive to the insertion of one of said resistors between said ring conductor and said grounded tip conductor for automatically adjusting the impendance of another of the legs in said bridge until said bridge is balanced, and means for determining the type of service requested in accordance with the value of the impedance of said other leg when said bridge is balanced.

2. A telephone signaling arrangement in accordance with claim 1 wherein said first means includes transistor means energized by said ground potential when said set goes off-hook and first relay means responsive to said transistor means and said second means includes semiconductor switch means responsive to de-energization of said transistor means on removal of said ground potential from said ring conductor and second relay means responsive to said semi-conductor switch means.

3. A telephone signaling arrangement in accordance with claim 2 wherein said control unit and said connecting means are common to a plurality of telephone sets and further including means responsive to one of said sets going off-hook for preventing seizure of said connecting means by any other of said sets.

References Cited

UNITED STATES PATENTS

| | | | |
|---|---|---|---|
| 1,736,283 | 11/1929 | Gardner | 179—16 |
| 2,410,050 | 10/1946 | Deakin | 179—18 |

KATHLEEN H. CLAFFY, *Primary Examiner.*

J. S. BLACK, *Assistant Examiner.*